United States Patent [19]

Ito et al.

[11] 3,955,035
[45] May 4, 1976

[54] TRANSPARENT RESIN COMPOSITE

[75] Inventors: Akihiko Ito; Isao Kaetsu; Hiroshi Okubo; Masamichi Kato, all of Takasaki; Koichiro Hayashi, Suita, all of Japan

[73] Assignees: Japan Atomic Energy Research Institute; Tokyo Optical Company, Ltd., both of Japan

[22] Filed: Aug. 6, 1974

[21] Appl. No.: 495,169

[30] Foreign Application Priority Data

Aug. 14, 1973  Japan .............................. 48-90535

[52] U.S. Cl. .......................... 428/334; 428/339; 428/413; 428/447; 428/452; 428/451
[51] Int. Cl.$^2$ .................. B32B 27/38; B32B 27/08
[58] Field of Search ........... 428/413, 447, 451, 452, 428/334, 339; 427/386, 387

[56] References Cited
UNITED STATES PATENTS

| | | |
|---|---|---|
| 3,451,838 | 6/1969 | Burzynski et al. ............. 428/451 X |
| 3,454,454 | 7/1969 | Sterman et al. ................. 428/451 X |
| 3,650,808 | 3/1972 | Gagnon .......................... 428/447 X |
| 3,707,397 | 12/1972 | Gagnon .......................... 428/451 X |

*Primary Examiner*—Harris A. Pitlick
*Attorney, Agent, or Firm*—Ladas, Parry, Von Gehr, Goldsmith & Deschamps

[57]  ABSTRACT

Transparent resin composites comprising a substrate of a transparent plastic material coated with a cured film of at least one [(2,3-epoxypropoxy)alkyl]trialkoxysilane or of at least one [(2,3-epoxypropoxy)alkyl]-trialkoxysilane and at least one transparent polymer compatible with said silane are provided. The resin composites have excellent abrasion resistance, surface hardness, heat resistance, chemical resistance, weathering resistance, etc. well retaining the transparency and other optical characteristics of the substrate resin. These resin composites can be used as transparent plastic panels, lenses, etc.

8 Claims, No Drawings

TRANSPARENT RESIN COMPOSITE

BACKGROUND OF THE INVENTION

This invention relates to a class of novel transparent composite resin materials the surface of which is provided with excellent abrasion resistance, hardness, heat resistance, chemical resistance, weathering resistance, etc.

Among the plastic materials in wide use today, acrylic and methacrylic resins are superior in mechanical properties, appearance and clarity. However, these resins are defective in that they are inferior in abrasion resistance and surface hardness. As a resin that is provided with rather high abrasion resistance, diethyleneglycol bis(allyl carbonate) polymer (CR39) is known. But the abrasion resistance and surface hardness of this resin are not quite satisfactory for many practical uses.

Therefore many methods for improving surface hardness of acrylic and methacrylic resins have been proposed and studied. For instance in Japanese Patent Application Publication No. 17847/60, a method in disclosed in which a crosslinking monomer such as diethylene- or triethyleneglycol dimethacrylate or an alkanediol dimethacrylate containing 3 – 6 carbon atoms is applied on the inside surface of a casting mold as a film and thereafter methyl methacrylate is cast-polymerized in said mold. In Japanese Patent Application Publication No. 9827/62, another method is disclosed in which a crosslinking monomer such as allyl methacrylate, ethylene dimethacrylate, etc. is applied on the inside surface of a casting mold and a resin article which has been formed by the same mold beforehand is placed therein and the mold is heated so as to polymerize the applied monomer. In Japanese Patent Laying-Open Publication No. 26419/72, a method is disclosed in which a solution prepared by mixing a hydrolysate of an alkyl silicate such as butyl silicate and a copolymer of vinyl triethoxysilane and vinyl acetate for instance in a solvent is applied on the surface of methacrylic resin plates and the plates are heated so as to cure the applied material.

In Japanese Patent Application Publication No. 34707/70, a surface coating composition is disclosed. Said composition comprises 3 – 30% aminoplast, 0.5 – 10% an epoxy-containing alkoxysilane and the balance is a hydroxyalkyl ester of vinylgroup-containing unsaturated carboxylic acid. This composition is applied on the surface of metal plates and cured by heating.

However, all these methods and compositions are inadequate and insufficient for hardening the surface of clear and transparent plastic materials. The methods of Japanese Patent Application Publication No. 17837/60 and Japanese Patent Application Publication No. 9827/62 are unsatisfactory in that a long time is required for curing of the coating or film and the abrasion resistance of the formed coating is not sufficiently high. The coating provided by the method of Japanese Patent Application Publication No. 34707/70 is not transparent and not so hard, and therefore improvement in surface hardness and abrasion resistance of plastic materials by coating cannot be expected from this method. The method disclosed in Japanese Patent Laying-Open Publication No. 26419/72 has a fatal defect in heat resistance and weathering resistance of the formed coating. That is, the coating formed on the surface of methyl methacrylate resin wrinkles within several minutes when heated over 80°C and the inherent optical characteristics of the substrate resin are spoiled. Also this method cannot be applied to some kinds of plastic materials, for instance, this method cannot be employed for a resin such as CR39.

In order to overcome the defects of the prior art as mentioned above, we studied the use to silicon-containing polymers as a coating for plastic materials, and we have succeeded in creating transparent and tough composite resin materials provided with excellent abrasion resistance, hardness, heat resistance, chemical resistance, weathering resistance, etc. by forming a surface film or layer of at least one of [(2,3-epoxypropoxy)alkyl]trialkoxysilanes on the surface of the known transparent plastic resins. It has been known that when a [(2,3-epoxypropoxy)alkyl]trialkoxysilane, for instance, [(2,3-epoxypropoxy)propyl]trimethoxysilane, is polymerized by addition of a suitable amount of a ring-opening polymerization catalyst, a colorless transparent polymeric resin is obtained. However, the thus obtained resin is very brittle with extremely low bending strength and tear strength, and finds no practical use in itself as a polymeric material.

We have found that a composite body prepared by forming a coating film or layer of a [(2,3-epoxypropoxy)alkyl]-trialkoxysilane of a suitable thickness on the surface of a transparent plastic material substrate is remarkably tough and transparent and the surface is provided with excellent abrasion resistance, hardness, heat resistance, chemical resistance, weathering resistance etc.

SUMMARY OF THE INVENTION

In accordance with this invention, a class of tough and transparent composite polymeric resin materials comprising a transparent polymeric resin substrate and a surface film or layer of at least one [(2,3-epoxypropoxy)alkyl]trialkoxysilane are provided.

A [(2,3-epoxypropoxy)alkyl]trialkoxysilane is represented by the general formula:

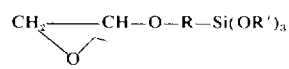

wherein R is an alkylene group containing up to 4 carbon atoms, and R' is an alkyl group containing up to 4 carbon atoms. Examples of [(2,3-epoxypropoxy)alkyl]trialkoxysilane are:

[(2,3-epoxypropoxy)methyl]trimethoxysilane, [(2,3-epoxypropoxy)methyl]triethoxysilane, [(2,3-epoxypropoxy)-methyl]tripropoxysilane, [(2,3-epoxypropoxy)methyl]tributoxysilane, [2-(2,3-epoxypropoxy)ethyl]trimethoxysilane, [2-(2,3-epoxypropoxy)ethyl]triethoxysilane, [2-(2,3-epoxypropoxy)ethyl]-tripropoxysilane, [2-(2,3-epoxypropoxy)ethyl]-tributoxysilane, [3-(2,3-epoxypropoxy)propyl]trimethoxysilane, [3-(2,3-epoxypropoxy)propyl]triethoxysilane, [-epoxypropoxy)propyl]tripropoxysilane, [3-(2,3-epoxypropoxy)propyl]-tributoxysilane, [4-(2,3-epoxypropoxy)butyl]trimethoxysilane, [4-(2,3-epoxypropoxy)-butyl]triethoxysilane, [4-(2,3-epoxypropoxy)butyl]tripropoxysilane, [4-(2,3-epoxypropoxy)-butyl]-tributoxysilane, etc. There is no limit in the chain length of the alkylene group R and the alkyl group R', since the chain lengths have no influence over the polymerization of the compound unless they are extraordinarily long. However, practically the chain length of the groups R and R' is limited to 4 carbon atoms in a normal chain.

[(2,3-Epoxypropoxy)alkyl]trialkoxysilanes are prepared by reacting an unsaturated epoxy compound, such as 2,3-epoxypropoxyethene; 3-(2,3-epoxypropoxy)propene-1; 4(2,3-epoxypropoxy)butene-1, etc. and a trialkoxysilane such as trimethoxysilane, triethoxysilane, etc. in the presence of the platinum catalyst or peracetic acid. Some of them are commercially available. [(2,3-Epoxypropoxy)propyl]trialkoxysilanes are most easily obtainable.

For the polymerization of said silane monomer, a cationic catalyst such as a Lewis acid, e.g., $BF_3$, $SnCL_4$, $ZnCL_2$, $FeCL_3$, $SbCL_5$; a complex of a Lewis acid and an oxygencontaining organic compound, e.g., ethyl ether; a Broensted acid, e.g., HCl, HBr, HI, $HNO_3$, $HClO_4$, $H_3PO_4$, a carboxylic acid, sulfonic acid, etc. Usually the catalyst is used in an amount of 0.01 – 3 parts by weight per 100 parts of [(2,3-epoxypropoxy)alkyl]trialkoxysilane, preferably in the form of diluted solution in a suitable solvent.

The film-forming composition of a [(2,3-epoxypropoxy)-alkyl]trialkoxysilane may, in addition to the catalyst, contain solvent, which may be reactive or inert, and further prepolymer of [(2,3-epoxypropoxy)alkyl]trialkoxysilane, if desired.

Examples of the inert solvent are aliphatic hydrocarbons, aromatic hydrocarbons, ethers, esters, nitriles, etc. The solvents which react with [(2,3-epoxypropoxy)alkyl]-trialkoxysilane include alcohols, water, etc. A suitable solvent is one which is in the liquid state at room temperature and boils at 50°– 200°C. Specific examples of the usable solvents are n-hexane, cyclohexane, benzene, methanol, ethanol, 1-propanol, 2-propanol, 1-butanol, 1-hexanol, 1-cyclohexanol, 1-octanol, chloroform, acetone, methyl ethyl ketone, tetrahydrofuran, 1,4-dioxane, ethyl acetate, butyl acetate, n-amyl acetate, methyl methacrylate, etc. Any one or a mixture of these compounds can be used, and the usable solvent is not limited thereto.

A solvent which more or less dissolves a substrate material contributes to firm adhesion of the surface layer to the substrate. Most part of the inert solvent used vaporizes after it has been applied to the surface of a substrate. Use of a reactive solvent makes the pot life of the coating composition short. Preferred amount of solvent to be added to the coating composition is not more than 30 parts by weight per 100 parts by weight of [(2,3-epoxypropoxy)alkyl]trialkoxysilane including prepolymerized part thereof. Water rapidly reacts with [(2,3-epoxypropoxy)alkyl]trialkoxysilane at room temperature or temperatures lower than that. Care must be taken when water is used.

As mentioned above, the coating composition may contain prepolymer of [(2,3-epoxypropoxy)alkyl]-trialkoxysilane. A composition containing a [(2,3-epoxypropoxy)alkyl]trialkoxysilane and prepolymer thereof can be prepared by simply prepolymerizing said silane. The prepolymerization can be effected by adding a ring-opening polymerization catalyst and, if desired, a suitable solvent to the silane and heating the mixture. The reaction should be stopped before the viscosity of the mixture reaches 2000 cp or more by cooling and tightly closing the reaction vessel. It is surmised that the polymerization reaction is accelerated by mositure from the atmosphere from the fact that the prepolymerization proceeds rapidly in an open vessel, but extremely slowly in a vessel closed air-tight.

Heating temperature for the prepolymerization is in the range of 35°– 200°C, preferably 60°– 150°C. It is desirable to adjust the viscosity of the coating composition to not more than 500 cp for the sake of ease in handling. The adjustment of viscosity can be effected by addition of a suitable solvent or monomeric [(2,3-epoxypropoxy)alkyl]trialkoxysilane per se.

The coating composition may further contain a transparent polymer compatible with [(2,3-epoxypropoxy)alkyl]-trialkoxysilane, such as polystyrene, poly(-methyl methacrylate), poly(glycidyl methacrylate), cellulose nitrate, cellulose acetate. The allowable content of these polymers in the composition is 60% by weight of the total composition at the heighest, preferably 40% by weight and more preferably 20% by weight.

The transparent plastic material which can be used as the substrate in this invention encompasses all the known transparent synthetic resins used for production of shaped articles such as poly(vinyl chloride) resin, poly(vinylidene chloride) resin, polycarbonate resin, resins comprising polymer or copolymer of acrylic or methacrylic acid ester, e.g. methyl methacrylate; poly(-diethyleneglycol bis(allyl carbonate)) resin, polystyrene resin, styreneacrylonitrile copolymer resin, polyvinylbutyral resin, cellulose acetate resin, polyester resin, etc.

The process for preparing the transparent composite resin materials of this invention is as follows:

The composition as explained in the above is applied to a substrate of any desired shape made of any of the above-mentioned known transparent synthetic resins by brushing, spraying, dipping, etc. The mode of application is selected by considering shape, configuration, use of the finished product, etc. Thereafter, the coated substrate is kept at a temperature in the range between 0°C and 200°C, preferably between 15°C and 150°C for several minutes to ten and several hours for curing. Once a coating film or layer has been formed, it remains stable, even if it is heated at 150°C for a long period.

Alternatively, the transparent composite resin material can be prepared by applying the coating composition inside a casting mold and curing it partially or totally and thereafter pouring the monomeric material of the substrate resin therein, and finally curing all the content of the mold. Or the coating composition is applied to the inside of a mold and thereafter placing a substrate body which has been prepared by the same mold in said mold, befoe the coating composition is not completely cured, and then curing the coating completely.

By any procedure, it is most important to form a coating film the thickness of which is within the range of from 0.003 to 2.0 mm, preferably 0.005 mm to 0.5 mm and more preferably 0.01 mm to 0.2 mm. A coating film thinner than the abovementioned range is inferior in abrasion resistance etc., and the film thicker than the above-mentioned range is inferior in impact resistance and easily suffers cracking.

The substrate body can be of any shape and configuration. However, it will be difficult to form a coating of uniform thickness on the surface of a body of complicated configuration. Thereafore, practically the substrate to which this invention is most effectively and advantageously applied is a plate or a lens. The most expected exploitation of this invention is manufacturing plastic panels and lenses.

Now the invention is illustrated by way of preferred embodiments. In the working examples that follow, abrasion resistance of the formed coating films was tested in accordance with the sand falling method (ASTM D673-44) and "haze" was determined according to the procedures of ASTM-D1003-61.

Surface hardness was tested by the method of JIS K5651, which is as follows.

The lead of a standard test pencil is exposed in the length of 3 mm without sharpening, the end surface of the exposed cylindrical lead is whetted flat on sand paper so that the circular peripheral edge of the end surface becomes sharp. The thus prepared pencil is positioned slant at the angle of 45° to the surface of a specimen to be tested. The end of the pencil lead is loaded with 1 kg, and the specimen is moved horizontally. The same test is repeated 5 times in different places on the surface. If scratches or break of the coating reaching the substrate is observed in two or more of 5 runs, the test is repeated with a pencil of one grade lower hardness. The hardness of the pencil, with which scratch is observed in less than 2 runs out of 5 runs, is indicated as the hardness of the tested specimen.

Adhesion of the film coating to the substrate material was tested by the following peel-off test method. A small grid-like pattern comprising 100 small 1 mm × 1 mm squares was provided on the surface of the coated film by using a razor blade to cut straight lines crosswise with 1 mm spare therebetween deep enough to reach the substrate. Then a strip of cellophane adhesive tape was stuck onto the thus provided grid pattern and then the tape was jerked up in the direction perpendicular to the grid surface. The number of small squares of film remaining was counted; a court of 100 means there was no peel-off.

In these examples parts mean those by weight if not specifically defined.

EXAMPLE 1

One hundred (100) parts of [(2,3-epoxypropoxy)-propyl]tri-methoxysilane and a catalyst solution consisting of 5 parts chloroform, 5 parts acetone, 1 part perchloric acid were mixed at 0°C. The thus obtained coating composition was applied to the surface of a plate of CR39 resin (diethyleneglycol bis-(allyl carbonate) polymer) placed horizontally so that a thin film of the composition was formed on the surface. The plate was kept in the atmosphere at room temperature for 16 hours for curing the composition. The film coating formed was 0.088 mm thick and transparency was such the excellent inherent optical characteristics of CR39 resin were not impaired. The film was hardly scratched, even when it was rubbed hard with steel wool. Pencil hardness was 9H or more. The result of peel-off test was 100, that is, there was no peel-off. The result of the abrasion test is shown in Table 1. The coated specimen showed no change after it was boiled in water for 4 hours, or after it was kept in ethanol, acetone, benzene, lacquer thinner, chloroform and 20% aqueous solution of NaOH for one week. Incidentally, the pencil hardness of CR39 resin was 3H.

EXAMPLE 2

One hundred (100) parts [(2,3-epoxypropoxy)-propyl]-trimethoxysilane and a catalyst solution consisting of 5 parts chloroform, 5 parts acetone and 0.5 part perchloric acid were mixed at 0°C. The thus obtained mixture was heated at 100°C for 4 hours to prepolymerize the said silane and a viscous composition was obtained. This was called Composition A.

Viscosity of Composition A was 500 cp. To 85 parts of Composition A, 15 parts of 1-butanol was added so as to make the viscosity of the composition 250 cp. This composition is called Composition B.

Plates of CR39 resin, hard poly(vinyl chloride), acrylonitrile-styrene-copolymer, and glycidyl methacrylate/ethyl acrylate copolymer were dipped in Composition B and were hung in an air bath of 110°C for 90 minutes. Thereafter, the plate specimens were kept at 60°C for 6 hours. The thickness of the formed film coating of each specimen was 0.010 - 0.04 mm. The film was excellent in transparency, had hardness of 9H or more, and hardly suffers scratching even when it is rubbed hard with steel wool. Abrasion resistance of the specimens was far better than that of CR39 resin. The result of the peel-off test was 100 in all the specimen.

EXAMPLE 3

Composition A in Example 2 was applied to the surface of 5 mm thick plates of CR39 resin placed horizontally so that specimens having coatings of various thicknesses were obtained. When a thick coating was to be formed, adhesive tape was put along the four edges of resin plates so as to hold the composition on the plate.

The coated specimens were kept in the atmosphere at room temperature for 24 hours for curing. Thus specimens having thicknesses as shown in Table 2 were obtained. Impact resistance of these specimens was measured by the ball dropping method.

The ball dropping test was carried out as follows. Steel balls (weights) of various weight as shown in Table 2 was dropped onto specimens from the height of 127 cm 4 times for each specimen. Numbers of runs in which no cracking occurred are shown in the table.

Table 2

| Thickness of coating | 10g | 15.8g | 20g | 30g | 40g | 50g |
|---|---|---|---|---|---|---|
| 2.3 mm | 4 | 0 | 0 | 0 | 0 | 0 |
| 2.0 mm | 4 | 2 | 0 | 0 | 0 | 0 |
| 0.61 mm | 4 | 4 | 4 | 4 | 0 | 0 |
| 0.48 mm | 4 | 4 | 4 | 4 | 4 | 4 |
| 0.052 mm | 4 | 4 | 4 | 4 | 4 | 4 |
| 0.005 mm | 4 | 4 | 4 | 4 | 4 | 4 |

The weights of 20g, 30g, 40g and 50g were of the capsule-shaped (⊂⊃)

and they were dropped so that the spherical end, the diameter of which is 5/8 inch, hit the specimens.

EXAMPLE 4

By varying the heating time in the procedure of Example 2, coating compositions having viscosities of 250 - 10 cp were obtained. These coating compositions were applied to the surface of CR39 resin plates by dipping and the plates were heated in the same way as in Example 2. Thus composite specimens having coating of thickness of 0.01 - 0.002 mm were obtained. Also composite specimens having coating of thickness of 0.05 - 0.1 mm were obtained by applying the coating composition the viscosity of which is 250 cp on the surface of CR39 resin plates placed horizontally and heated in the same way as above. Thickness was varied by regulating amount of the composition applied.

The sand falling test was carried out with these specimens and the results are summarized in Table 1.

EXAMPLE 5

Eighty-five (85) parts of Composition A of Example 2 and 20 parts of an ethyl acetate solution containing 5 parts cellulose nitrate were mixed. A poly(methyl methacrylate) plate was dipped in this mixture, and was hung in an air bath kept at 100°C for 50 minutes for curing. The thickness of the formed coating was 0.01 mm. The obtained composite was transparent and hardly suffered scratching when rubbed hard with steel wool. Its pencil hardness was 9H or higher, the result of the peel-off test was 100, and the result of the sand falling abrasion test is shown in Table 1.

EXAMPLE 6

One hundred (100) parts of [(2,3-epoxypropoxy)-propyl]-triethoxysilane and a catalyst solution consisting of 15 parts 1-butanol and 1 part BF$_3$-etherate were mixed at 0°C. The thus obtained mixture was heated at 60°C in an open vessel until the viscosity thereof reached about 90 cp. This coating composition was applied to the surface of a CR39 resin plate and the coated film was cured in an air bath of 150°C for 1 hour. The thickness of the formed coating film was 0.007 mm and the resin composite plate had excellent transparency. The surface hardly suffered scratching even if it is rubbed hard with steel wool. Abrasion resistance of the specimen was far better than CR39 resin. The result of the peel-off test was 100, and the result of the sand falling test is shown in Table 1.

EXAMPLE 7

One hundred (100) parts of [(2,3-epoxypropoxy)ethyl]-triethoxysilane and a catalyst solution consisting of 25 parts dioxane, 5 parts poly(gylcidyl methacrylate) and 1 part phosphoric acid were mixed at room temperature. The mixture was heated at 120°C in an open vessel with stirring until the viscosity of the mixture reached about 250 cp. The thus obtained coating composition was applied to the surface of a poly(methyl methacrylate) resin plate and the plate (specimen) was hung in an air bath of 100°C for 1 hour and further at 60°C for 16 hours. The thickness of the formed coating film was 0.010 mm. The obtained composite specimen had excellent transparency. The pencil hardness thereof was 8H and the surface hardly suffered scratching even if it was rubbed hard with steel wool. The abrasion resistance of the specimen was far better than CR39 resin. The result of the sand falling abrasion test is shown in Table 1. Incidentally the pencil hardness of poly(methyl methacrylate) resin plates was 5 H.

Table 1

| Sample | Haze (%) |
|---|---|
| Product of Example 1 | 8 |
| Product of Example 5 | 11 |
| Product of Example 6 | 12 |
| Product of Example 7 | 12 |
| CR39 resin plate (control) | 18 |
| Poly(methyl methacrylate) resin (control) | 57 |

Table 1-continued

| Sample | Haze (%) |
|---|---|
| Glass plate (control) | 8 |

Table 3

| Tickness of coating (mm) | 0.1 | 0.05 | 0.01 | 0.05 | 0.003 | 0.002 | 0* |
|---|---|---|---|---|---|---|---|
| Haze (%) | 8 | 9 | 11 | 13 | 17 | 21 | 19 |

*CR39 plate without coating

What we claim is:

1. A transparent resin composite comprising a substrate of a transparent plastic material coated with a cured film of at last one [(2,3-epoxypropoxy)alkyl]-trialkoxysilane represented by the general formula:

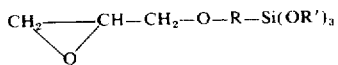

whereby R is an alkylene group containing up to 4 carbon atoms and R' is an alkyl group containing up to 4 carbon atoms.

2. The transparent resin composite as claimed in claim 1, wherein R of the general formula is one of methylene, ethylene and trimethylene and R' is one of methyl, ethyl, n-propyl and n-butyl; and the transparent plastic material is selected from a class consisting of poly(vinyl chloride) resin, poly(vinylidene chloride) resin, polycarbonate resin, poly(lower-alkyl acrylate) resins, poly(lower-alkyl methacrylate) resins, poly(diethyleneglycol bis(allyl carbonate)) resin, polystyrene resin, styrene-acrylonitrile copolymer resin, polyvinylbutyral resin, cellulose acetate resin, and polyester resin and the thickness of the cured coating film is 0.003 -2.0 mm.

3. The transparent resin composite as claimed in claim 2, wherein R of the general formula is one of trimethylene and ethylene, R' is one of methyl and ethyl, the transparent plastic material of the substrate is selected from a class consisting of polycarbonate resin poly(methyl acrylate) resin, poly(methyl methacrylate) resin, poly(ethyl acrylate) resin, poly(ethyl methacrylate) resin, poly(diethyleneglycol bis(allyl carbonate) resin, and the thickness of the cured coating film is 0.005 – 0.5 mm.

4. The transparent resin composite as claimed in claim 3, wherein R of the general formula is trimethylene and R' is methyl, and the thickness of the cured coating film is 0.01 – 0.2 mm.

5. A transparent resin composite comprising a substrate of a transparent plastic material coated with a cured film of at least one [(2,3-epoxypropoxy)alkyl]-trialkoxysilane represented by the general formula: represented by the general formula:

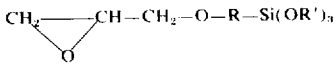

whereby R is an alkylene group containing up to 4 carbon atoms and R' is an alkyl group containing up to 4 carbon atoms, and a transparent polymer which is compatible with [(2,3-epoxypropoxy)propyl]trialkoxysilanes.

6. The transparent composite resin material as claimed in claim 5, wherein R of the general formula is one of methylene, ethylene and trimethylene and R' is one of methyl, ethyl, n-propyl, and n-butyl; the transparent polymer compatible with [(2,3-epoxypropoxy)alkyl]trialkoxysilane is selected from a class consisting of polystyrene, poly(lower-alkyl acrylate), poly(lower-alkyl methacrylate), poly(gylcidyl methacrylate), cellulose nitrate, and cellulose acetate and the transparent plastic material of the substrate is selected from a class consisting of poly(vinyl chloride) resin, poly(lower-alkyl acrylate) resin, poly(lower-alkyl methacrylate) resin, poly(diethyleneglycol bis(allyl carbonate)) resin, polystyrene resin, styrene-acrylonitrile copolymer resin, polyvinylbutyral resin, cellulose acetate resin and polyester resin, and the thickness of the cured coating film is 0.003 – 2.0 mm.

7. The transparent composite resin material as claimed in claim 6, wherein R of the general formula is one of trimethylene and ethylene, R' is one of methyl and ethyl, the transparent polymer compatible with [(2,3-epoxypropoxy)alkyl]-trialkoxysilane is selected from a class consisting of poly(lower-alkyl acrylate), poly(lower-alkyl methacrylate), polystyrene and cellulose acetate, and the transparent plastic material of the substrate is selected from a class consisting of polycarbonate resin, poly(methyl acrylate) resin, poly(methyl methacrylate) resin, poly(ethyl acrylate) resin, poly(ethyl methacrylate) resin, poly(diethyleneglycol bis(allyl carbonate)) resin, and the thickness of the cured coating film is 0.005 – 0.5 mm.

8. The transparent composite resin material as claimed in claim 7, wherein R of the general formula is trimethylene and R' is methyl and the thickness of the cured coating film is 0.1 – 0.2 mm.

* * * * *